(12) United States Patent
Albrecht et al.

(10) Patent No.: US 6,785,387 B1
(45) Date of Patent: Aug. 31, 2004

(54) TELEPHONE FOR CHILDREN

(75) Inventors: Uwe Albrecht, Hoehenkirchen-Siegertsbrunn (DE); Stefan Prange, Munich (DE); Joerg Siewerth, Hohenbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/869,822

(22) PCT Filed: Jan. 3, 2000

(86) PCT No.: PCT/DE00/00012
§ 371 (c)(1),
(2), (4) Date: Jul. 5, 2001

(87) PCT Pub. No.: WO00/41380
PCT Pub. Date: Jul. 13, 2000

(30) Foreign Application Priority Data

Jan. 5, 1999 (DE) .......................... 199 00 167

(51) Int. Cl.[7] .............................. H04M 1/00
(52) U.S. Cl. ............... 379/433.06; 379/433.07; 379/368
(58) Field of Search ............... 379/368, 433.06, 379/433.07, 433.12, 433.13; 455/90.3, 575.3, 575.4, 575.8

(56) References Cited

U.S. PATENT DOCUMENTS

| | | | |
|---|---|---|---|
| 4,802,210 A | | 1/1989 | Spencer et al. |
| 5,365,570 A | | 11/1994 | Boubelik |
| 5,584,054 A | * | 12/1996 | Tyneski et al. .......... 455/575.8 |
| 5,790,652 A | * | 8/1998 | Gulley et al. ............... 379/368 |

FOREIGN PATENT DOCUMENTS

| | | |
|---|---|---|
| DE | 298 05 828 | 9/1998 |
| EP | 0 414 365 A2 | 2/1991 |

OTHER PUBLICATIONS

Siemens—Die Mobilteile zum Betrieb an Gigaset 1020, Gigaset 1030, Gigaset 2020 and Gigaset 2030.

* cited by examiner

Primary Examiner—Jack Chiang
(74) Attorney, Agent, or Firm—Bell, Boyd & Lloyd LLC

(57) ABSTRACT

In order to be able to convert a fully functional telephone, in particular a mobile telephone, into a "child's telephone" without requiring a large degree of expenditure, it is provided that, if appropriate in addition to further keys, just one of more keys for dialing a telephone number are accessible on the telephone, which further keys cause a stored telephone number to be dialed when they are activated.

16 Claims, 5 Drawing Sheets

TELEPHONE FOR CHILDREN

BACKGROUND OF THE INVENTION

1. Field of the Invention

The present invention relates to a telephone, particularly a mobile telephone for use by children, which is designed such that only certain preprogrammed keys for dialing a telephone number stored in an electronic memory of the telephone are accessible to the child.

2. Description of the Prior Art

By providing their child with a known telephone, particularly a mobile telephone, parents enable the child to establish, in an emergency, a link to an emergency call center, such as a rescue center or the police. In addition to establishing a link to an emergency call number or an office associated with the emergency call number, however, it is also possible in conventional mobile telephones to establish any other desired telephone links. Because this can entail considerable costs for the parents, many parents refrain from making use of this facility which is in itself desirable.

According to the current state of the art, there are various possible ways of enabling mobile telephones to make rapid emergency calls.

The American U.S. Pat. No. 5,365,570 A discloses, for example, a mobile terminal which is equipped for rapid emergency calls and which has a loudspeaker, microphone and a keypad which has an emergency call key for dialing the emergency call number 911 which is valid in the United States. When this emergency call key is activated, a link can be made quickly to the police, to the fire service or to a local rescue center.

A further American patent U.S. Pat. No. 4,802,210 A is concerned with a security device which can be used to prevent unauthorized access to some of the keys on the keypad of a mobile telephone. The security device is composed here of a plastic cover panel which is hooked onto one side of the key panel into a cutout provided for that purpose in the housing, and which can be locked on the opposite side of the key panel using a snap closure mechanism. The cover panel cannot be removed until after it is unlocked using a special key. The cover panel contains here two square-shaped openings which permit access to only two of the keys of the key panel.

Furthermore, according to the current state of the art further mobile telephones are known which have cover devices for some of the keys on the keypad of the mobile telephone. In European patent EP-0 414 365 A, a mobile phone is described which is composed of two housing parts A and B which can be inserted one into the other and which are held together by a helical spring. The housing part A contains a loudspeaker, a keypad TF1 for the keys of the dialing numerals and a keypad TF2 for additional function keys, and housing part B contains a microphone. In the fully pulled-out state of the housing parts A and B of the mobile telephone, a user has complete access both to the keys of the keypad TF1 and to the keys of the keypad TF2. In this case, all the functions of the mobile telephone are completely available to him. In contrast, in the state in which the housing parts A and B of the mobile telephone are pushed together, the keys of the keypad TF1 are covered in order to prevent unintentional, accidental incorrect activation of the keys as a result of lack of attention by an adult user or as a result of access by children. In this case, activating the keys of the keypad TF2 provides a user with only a limited functional scope of the mobile telephone. In this state, the keypad TF1 is protected against serious damage which can occur, for example, when the user inadvertently drops the mobile telephone.

An object of the present invention, therefore, is to provide a telephone, in particular a mobile telephone, which is suitable for children, keeping the above concerns in mind

SUMMARY OF THE INVENTION

Accordingly, the present invention is directed to a conventional telephone, such as a mobile telephone or a wireless telephone, designed in such a way that just one or more preprogrammed keys for dialing a telephone number stored in an electronic memory of the telephone are accessible. In order to achieve this, the conventional mobile telephone is provided with a cover which covers all the keys and via which any desired non-preprogrammed telephone link can be established. This will relate, in particular, to the numerical keys, but is not restricted to this depending on the mobile telephone.

In order to bring about the desired function on a known mobile telephone, there is provision for the parents or a service center to preprogram the keys which are not covered by the cover with one telephone number in each case. The telephone number which is input when the keys are assigned and which can be dialed by activating the respective key is stored in the electronic memory of the mobile telephone. One of the keys which is still accessible after the cover is mounted is preferably pre-assigned to an emergency call number, such as 110, 112 etc. After the pre-assignment of the keys has been performed in the fashion described, the cover is detachably fastened to the keypad of the mobile telephone. For this reason, the cover then permits access only to such keys with which either no telephone link can be established or merely a telephone link can be established to a preprogrammed or predetermined telephone number; for example, an emergency call center, the mobile telephone number of the mother or the father, and so on.

The cover is preferably fastened on the upper side of the housing in such a way that the cover can be removed again only with a special tool. The special tool can be, for example, a key via which a child protection which is inserted into a socket can be pulled out. The "beard" of the key is inserted into a (slot-shaped) opening in the cover as in the case of the child protection, and turned slightly. Pulling arms on the beard then engage behind the cover so that the latter can be pulled off from a clamping arrangement on the housing of the telephone. If the cover is fastened to the upper side of the housing of the telephone by, for example, screws, they may be, for example, screws which do not have a slot but are rather provided with two blind holes which are provided to the left and right of the center of the screw head. The corresponding screwdriver or some other special tool and the cover can then be included, for example, with a telephone which permits the above mentioned functions. In this way, the parents can also easily "convert" a corresponding telephone into a "child's telephone" with an emergency call function.

In an alternative and/or additional solution there is provision for the telephone of the present invention to have a link-establishing device which establishes a telephone link with a telephone number stored in the memory of the telephone if a key assigned to the stored telephone number is activated.

In order to bring about this function, the link-establishing device can be activated or deactivated via the correct entry of a PIN (Personal Identification Number). In order, therefore, to be able to convert, for example, a fully functional mobile telephone into a child's mobile telephone, the corresponding menu item of the operating software of the mobile telephone is selected. The software requests the currently active PIN which is input, for example, by one of the parents, compares the entered PIN with a stored PIN and, if both correspond, activates the link-establishing device so that the latter prevents a telephone link being established to a subscriber of a telephone number which is not authorized. Before or after this procedure, the software preferably requests the telephone numbers which are assigned to the corresponding keys of the mobile telephone; these being, for examples the mobile telephone number of the mother and so on. This restriction of the functionality of the mobile telephone to its use as a child's mobile telephone can then be cancelled, for example, and the mobile telephone can be converted to its normal functionality by one of the parents inputting the correct PIN. For this purpose, a corresponding menu item is preferably provided in the operating software of the mobile telephone.

In one preferred embodiment of the present invention, there is provision that when the "child's mobile phone mode of operation" is activated one key of the mobile telephone is automatically assigned an emergency call number, such as 110, 112 or some other suitable emergency call number in the operating zone of the mobile telephone, by the operating software of the mobile telephone. In another exemplary embodiment, this assignment can alternatively or additionally be brought about by virtue of the fact that the mobile telephone is provided with an electrical contact which is closed by the cover being slid on or pressed on or the like onto the upper part of the housing.

In order to prevent any desired telephone number being able to be dialed, a cover according to the present invention covers at least all the keys of the telephone via which a single number can be dialed, in particular insofar as this is not already prevented by the link establishing device. Apart from this aspect, it also may be appropriate to provide a telephone which is functional per se with a cover according to the present invention in order to make the telephone easier to use. This is achieved in that a selection of the accessible keys of the telephone is made via the cover and all or a portion of the keys of the telephone which are made accessible by the cover is assigned to pre-programmed telephone numbers.

In a more preferred embodiment of the present invention, there is provision that the cover covers the emergency call key with a predetermined breakage or predetermined bending region so that the key cannot be activated until the region has been destroyed or bent, which is easy to bring about.

Likewise, there may be a provision that the cover is formed integrally onto the upper shell of the housing of the mobile telephone. A corresponding upper shell of the housing can then be included with the mobile telephone, for example, when it is sold, so that the corresponding upper shell of the housing can be replaced (as easily as possible via appropriate measures) with the already pre-mounted upper shell of the housing without a cover. This can take place, for example, at the place where the customer acquires its mobile telephone. Furthermore, it is conceivable for an appropriate upper shell of the housing to be available with a cover as an accessory. In another exemplary embodiment of the present invention, there is provision for the mobile telephone to be supplied with an upper shell of the housing which already has a corresponding cover.

In a further exemplary embodiment of the present invention there is provision that the cover is designed in such a way that lettering cards can be mounted on the cover next to non-covered keys for dialing a pre-assigned telephone number or the like. These lettering cards then indicate to the child or another person the function of the adjacent, accessible key of the mobile telephone. The function of the respective key can be indicated via the adjacent lettering card or the like via a suitable text or even via pictograms or the like. Standard lettering cards are preferably included with the mobile telephone.

Of course, the measures according to the present invention not only apply to a mobile telephone, such as what is referred to as a mobile phone, for making telephone calls in one or more mobile radio networks or for a wireless telephone for operating in the vicinity of a base station assigned to the wireless telephone, but also apply to a wire-bound telephone for operating on a telephone socket.

In summary, corresponding operating software or the like and/or a corresponding cover in a mobile telephone in which individual keys can be pre-assigned to a telephone number therefore permits a simple and cost-effective conversion of a telephone which has unrestricted functional capability, such as in particular a mobile telephone, into a child's mobile phone or child's telephone in which the child or another person requiring help is enabled to establish a telephone link to an emergency call center or to predetermined telephone subscribers. This conversion of an initially completely functional telephone into a telephone with restricted functional capability can be easily reversed again by the measures according to the present invention. Of course, the aforementioned functions, which are made possible by the software of the telephone, a also can be implemented by suitable hardware or by inputting specific key combinations.

Until now the point has been made that telephones or covers according to the present invention can be used by children. Of course, the use of the telephones or covers according to the present invention is not restricted to this group of persons. The telephones and covers according to the present invention are suitable not only for children but also, for example, for persons with health risks, elderly people and even persons engaged in hazardous sports.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
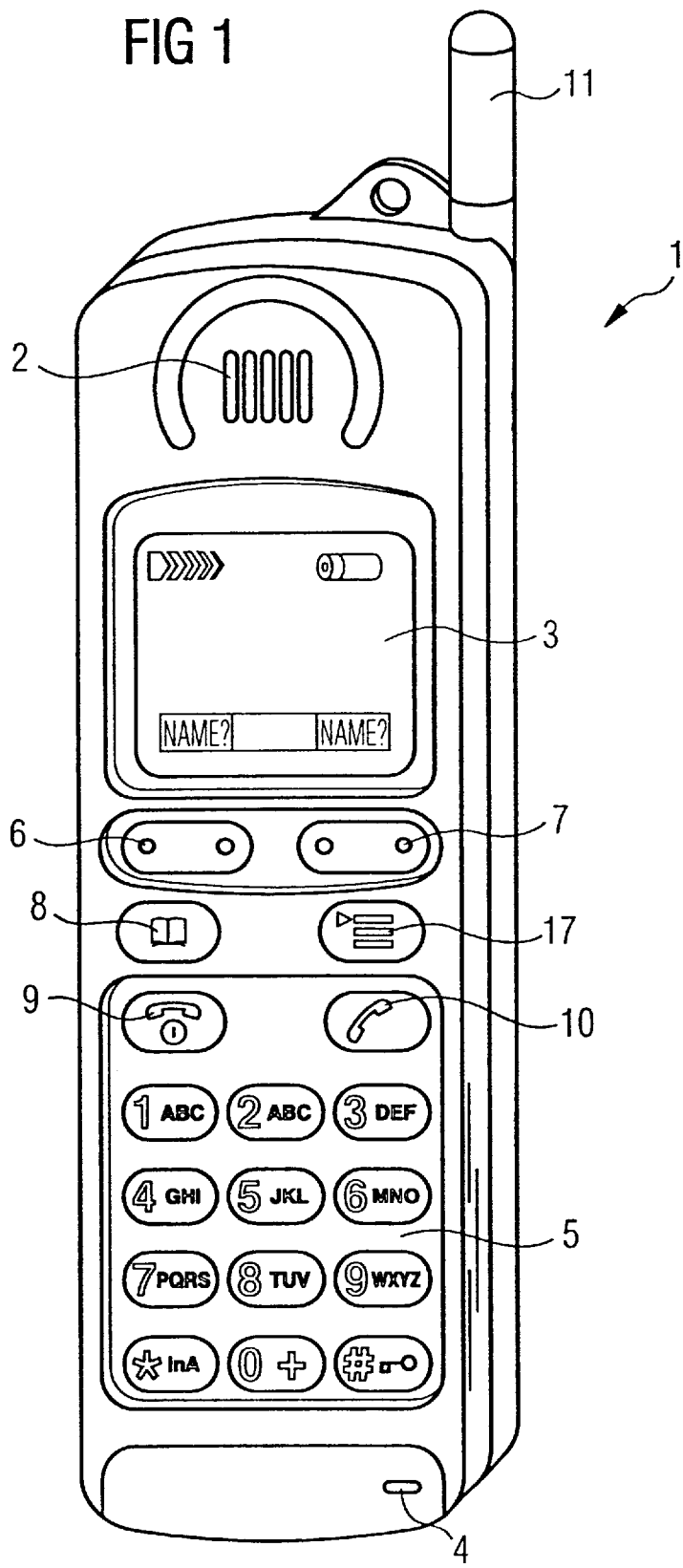
FIG. 1 shows a known mobile telephone with full functional capability.

The known mobile telephone 1 according FIG. 1 has, in particular, a loudspeaker 2, a display 3, a microphone 4, a keypad 5, a first cursor toggle switch 6, a second cursor toggle switch 7, a telephone directory key 8, an on hook key 9, an off hook key 10 and an antenna 11.

In order to establish a particular desired telephone link, the off hook key 10 is activated, and then the numerical keys are activated in the customary fashion in order to dial a telephone number. Alternatively, in the mobile telephone with full functional capability (illustrated in FIG. 1) it is also possible to establish a telephone link by pressing the telephone directory key 8, selecting an entry in the telephone directory of the mobile telephone using the first and/or second cursor toggle switch 6, 7 and subsequently dialing the telephone number after activating a confirmation key 17. In order to terminate the telephone link, the user of the mobile telephone 1 presses the on hook key 9.

If the user of the mobile telephone 1 wishes to restrict the functionality of the mobile telephone, in particular in order to make it available to a child or a person requiring help, the user selects an appropriate menu item (not illustrated) of the operating software (Firmware) of the mobile telephone; for example, using the toggle switches 6 and 7. The software of the mobile telephone requests, via the display 3, the PIN (Personal Identification Number) of the user. The user enters his PIN via the numerical field (not yet covered) and the software of the mobile telephone checks whether the PIN entered by the user of the mobile telephone corresponds to the PIN provided in the mobile telephone for activating the "child's mobile phone function". This PIN is preferably the same PIN which the user must enter in order to make his mobile telephone operational.

After a comparator in the electronics system (not illustrated) of the mobile telephone has determined that the user is authorized to activate the child's mobile phone function, the software of the mobile telephone inquires which telephone numbers are to be assigned to the keys which are made available in the "child's mobile phone mode of operation".

Likewise, the software operating system of the mobile telephone 1 indicates that an emergency call number, such as the telephone number 10 if the mobile telephone is sold and marketed in Germany, is already assigned to the emergency call key 13 in the "child's mobile phone mode of operation" by the Firmware. This can, if necessary, be adapted to the local conditions by the user. After the first programmable numerical key 14, the second programmable numerical key 15 and the third programmable numerical key 16 (cf. FIG. 2) are pre-assigned by the inputting of the telephone numbers assigned to the keys, the user confirms the correctness of the inputs and activates the child's mobile phone mode of operation. When the child's mobile phone mode of operation is activated, a link-establishing device (not illustrated) in the electronic system of the mobile telephone 1 prevents a telephone link being established to a telephone number which differs from the telephone numbers which are assigned to the programmable numerical keys 14, 15 and 16 and stored in a memory (not illustrated) of the mobile telephone 1. Likewise the link-establishing device according to the present invention prevents a telephone link being established to a telephone number which is stored in the telephone directory of the mobile telephone 1 and which is not authorized for dialing.

Figure 2:
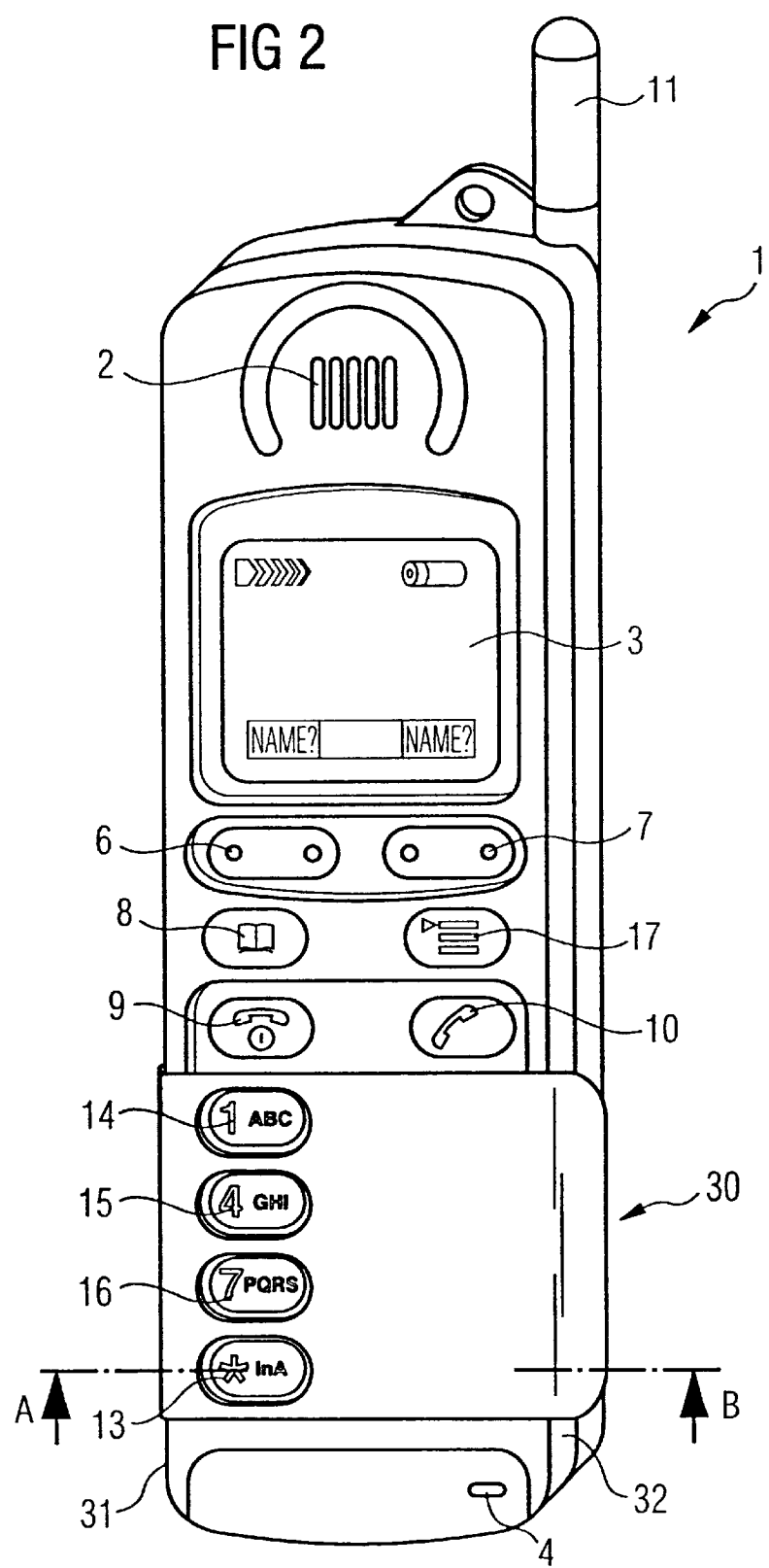
FIG. 2 shows the mobile telephone from FIG. 1 onto which a first cover has been fitted in the vicinity of the keypad in order to restrict the functionality of the mobile telephone.
Figure 4:
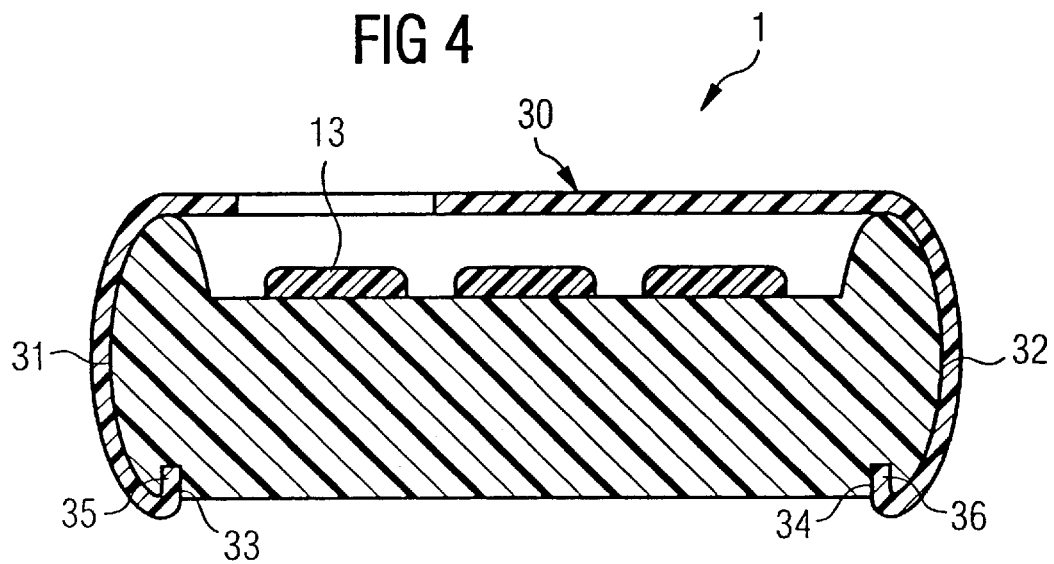
FIG. 4 shows the mobile telephone from FIG. 2 with the first cover in cross section along the sectional line A-B in which the electronic components of the mobile telephone are not illustrated.

The cover 30 illustrated in FIG. 2 is subsequently fitted onto the mobile telephone 1 and covers the non-preprogrammed keys in the child's mobile phone mode of operation. The cover 30 surrounds the keypad 5 and the left-hand and the right-hand lateral surfaces 31 and 32 of the telephone 1 and then extends on over the lateral surfaces to the underside of the telephone 1, as is clear in particular from FIG. 4. In the vicinity of the left-hand and right-hand underside of the housing of the telephone 1, the cover 30 is bent upward at each of its lateral surfaces and forms a left-hand guide rail 35 and a right-hand guide rail 36, as is clear in FIG. 4 from the sectional view along the sectional line A-B in FIG. 2. The underside of the housing of the telephone 1 has, in the vicinity of the left-hand lateral surface 31 and of the right-hand lateral surface 32, a left-hand guide groove 33 and a right-hand guide groove 34 which extend along the left-hand and right-hand lateral surfaces 31 and 32. The left-hand guide groove 33 and the right-hand guide groove 34 preferably start at the lower end of the telephone 1. When the cover 30 is mounted, it is fitted onto the mobile telephone from below, i.e. from the microphone side, the left-hand guide rail 35 sliding in the left-hand guide groove 33, and the right-hand guide rail 36 sliding in the right-hand guide groove 34. The cover 30 is then fitted onto the mobile telephone until the cover 30 exposes the preprogrammed numerical keys 13, 14, 15, 16 in its final position and covers all the other numerical keys. The guide grooves 33 and 34 and the guide rails 35 and 36 are preferably matched to one another in their dimensions in such a way that the respective rear end of the guide groove 33 or 34 forms, in this final position, a stop for the left-hand guide rail 35 and the right-hand guide rail 36.

In the final position, a projection or the like which is respectively provided on the right-hand and left-hand guide rail 35, 36 latches into a complementarily shaped recess in the guide groove 33 and 34. In order to release the cover, it is then necessary to use a screwdriver, for example.

Figure 3:
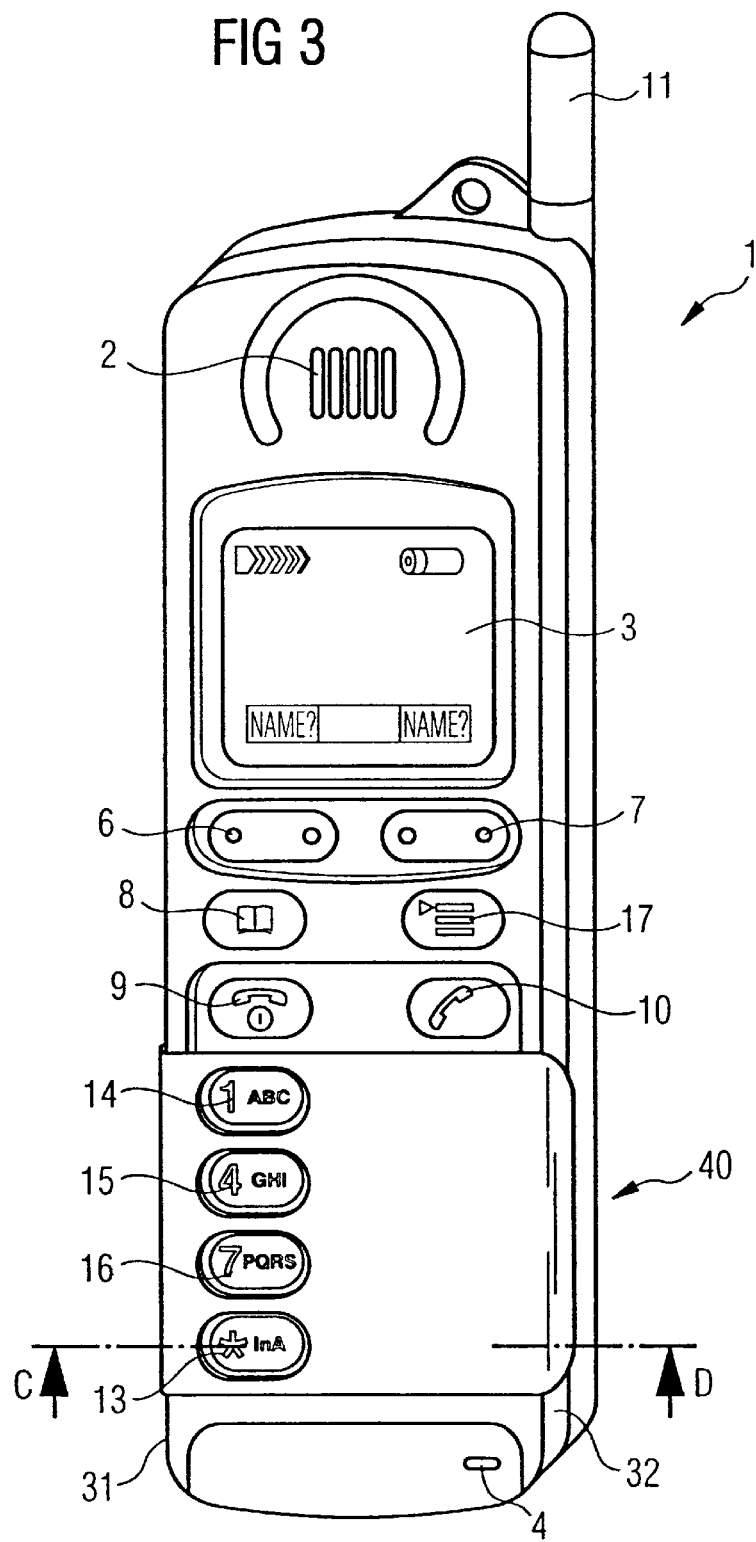
FIG. 3 shows the mobile telephone from FIG. 1 onto which a second over has been fitted in order to restrict the functionality.
Figure 5:
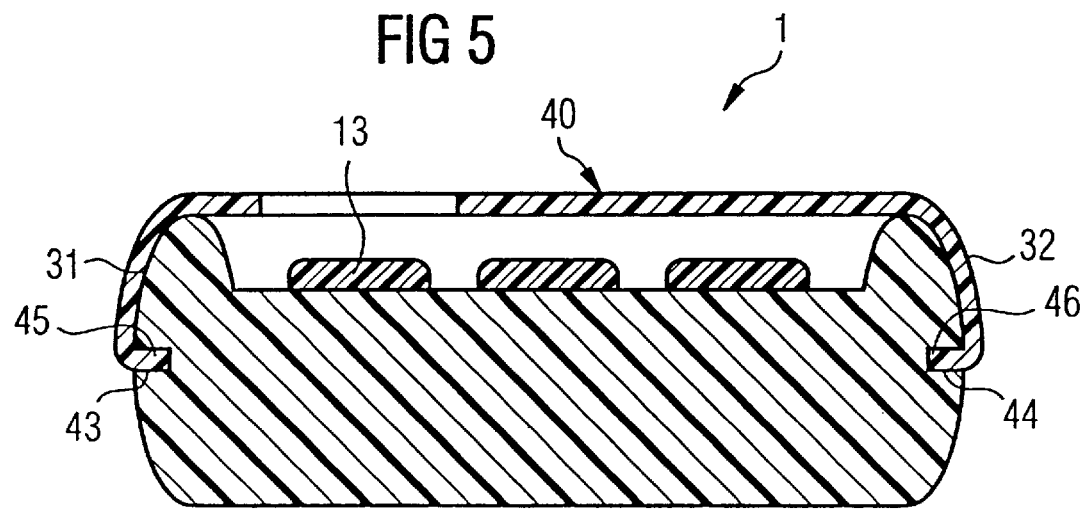
FIG. 5 shows the mobile telephone from FIG. 3 with the second cover in cross section along the sectional line C-D in which the electronic components of the mobile telephone have been omitted.

The cover 40 illustrated in FIG. 3 differs from the cover 30 illustrated in FIG. 2 in that a left-hand guide groove 43 is provided in the left-hand lateral surface 31, and a right-hand guide groove 44 is provided in the right-hand lateral surface 32 of the telephone 1. In the fitted-on state, the left-hand guide rail 45 of the cover 40 lies in the left-hand guide groove 43, and the right-hand guide rail 46 lies in the right-hand guide groove 44 of the telephone 1, as is clear in particular from FIG. 5. The cover 40 is fitted on in the same way as the cover 30 is fitted on. Likewise, the left-hand guide groove 43 and the right-hand guide groove 44 can also form a stop for the cover 40 when the latter reaches its final position after being fitted onto the telephone 1.

In order to fasten the cover on the upper side of the housing of the mobile telephone 1 it is possible, for example, also to provide a clamp arrangement or a latch device in the vicinity of the keypad 5.

Figure 6:
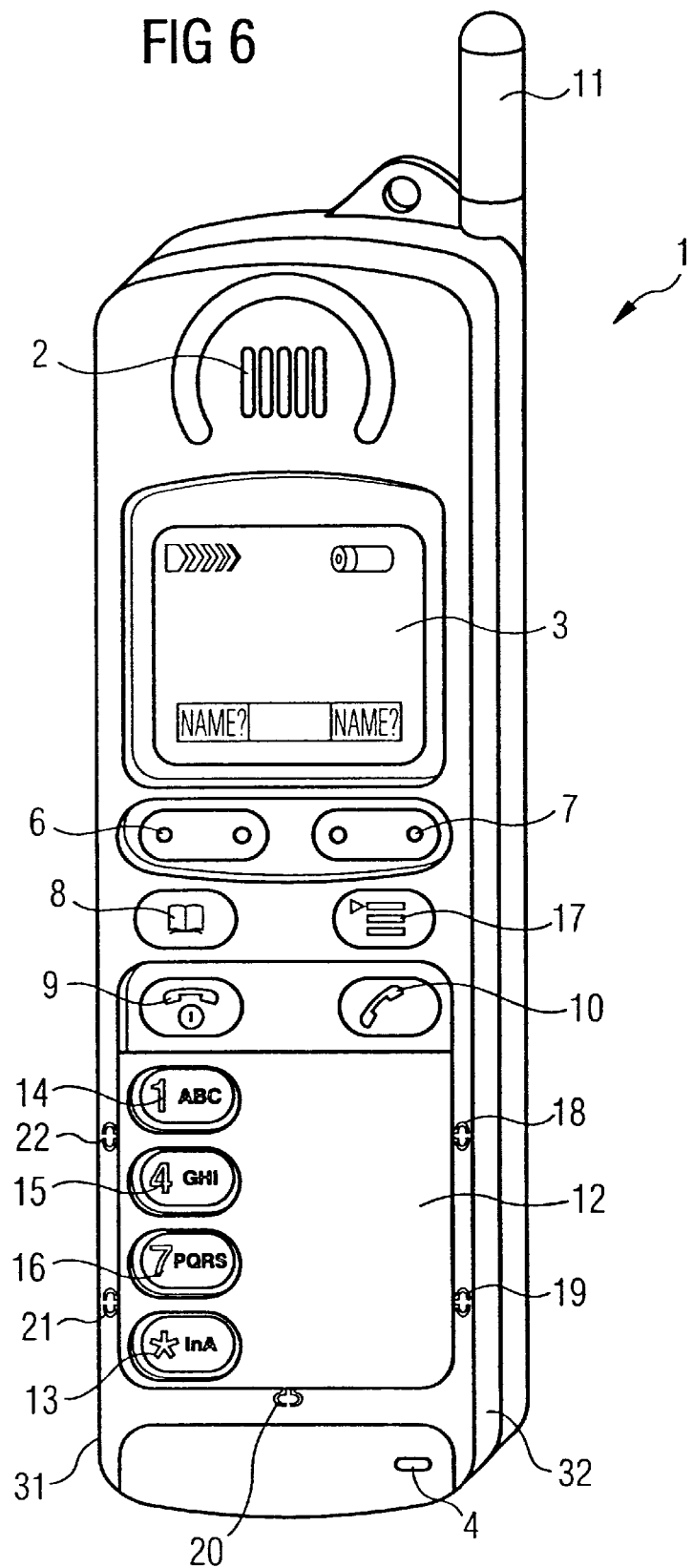
FIG. 6 shows the mobile telephone from FIG. 1 with a third cover in the vicinity of the keypad.

An example of a possible latch device is described below in more detail. The mobile telephone 1 has a countersunk keypad 5. In the vicinity of the cover 12 (illustrated in FIG. 6), and the three edge regions of the keypad 5 adjoining the cover 12, cutouts (not illustrated) through which spring-back mounts 18, 19, 20, 21 and 22 engage are provided, the cut-outs holding the cover 12 on the keypad 5 of the mobile telephone 1. For the sake of clarity, the spring-back mounts 18, 19, 20, 21 and 22 have been illustrated in FIG. 6. In the specific embodiment of the present invention, the spring-back mounts are bent under the edge regions of the keypad 5.

In order to prevent the cover 12 lifting off slightly from the keypad 5, which is undesirable, it is possible to provide a conical screw, which penetrates the upper side of the housing from above, between the respective two spring-back limbs of the spring-back mounts 18, 19, 20, 21 and 22, the screw being screwed into the upper side of the housing and subsequently pressing the spring-back limbs of the respective spring-back mount apart so that the spring-back limbs cannot be pulled out of the cutouts in the edge regions of the keypad 5. In order to prevent unauthorized removal of the screws and subsequently of the cover 12, the latter preferably have, instead of a slot, two or more blind holes which are provided off center in the screw head. A corresponding screw can then only be unscrewed with a special screwdriver which is adapted to this screw. Of course, the latch device can also be designed in some other way if another special tool is to be used to release the cover. For example, it also could be possible to lift off the cover from the keypad 5 from a clamping arrangement of the cover to the elevated edge regions of the keypad 5 using a special key, as in the case of a child safety plug.

Such a way of securing the cover 12, 30, 40 on the keypad 5 which is brought about via the described special screws or the like preferably will be provided only if the mobile telephone does not have the link-establishing device (not illustrated) which prevents the use of the numerical keys located under the cover by software or hardware means.

The cover 12, 30, 40 preferably has, next to the preassigned programmable numerical keys 14, 15 and 16 and next to the emergency call key 13 respectively, lettering (not illustrated) which indicates the function of the respective key. For this purpose, the lettering fields can be provided with lettering cards, for example.

The cover 12, 30, 40 which is provided with cutouts in the vicinity of the programmable numerical keys 14, 15, 16 and the emergency call key 13 preferably has, in the vicinity of the emergency call key 13, a protective cover (not illustrated) for protecting against unintentional activation of the emergency call key 13. The protective cover may be, for example, a predetermined breakage or predetermined bending region of the cover so that the protective cover can be destroyed relatively easily or can be bent in order to activate the emergency call key 13. Of course, some other suitable measure for protecting against incorrect activations may also be provided.

Although the present invention has been described with reference to specific embodiments, those of skill in the art will recognize that chances may be made thereto without departing from the spirit and scope of the invention as set forth in the hereafter appended claims.

What is claimed is:

1. A telephone, comprising:
   a loudspeaker;
   a microphone;
   an electronic memory;
   at least one keypad having at least one programmable key, wherein a telephone number which is both associated with the programmable key and stored in the electronic memory is dialed upon actuation of the at least one programmable key;
   a cover covering keys of the at least one keypad except for at least one key of the at least one programmable key; and
   software providing first and second operating modes of the telephone user selectable by use of a security code, the second operating mode having reduced functionality relative to the first operating mode, wherein when the telephone is in the second reduced functionality mode, a substantial number of the keys covered by the cover are electronically inoperable and the at least one key not covered by the cover is electronically operable.

2. A telephone as claimed in claim 1, further comprising:
   a link-establishing device which sets up a telephone link with the telephone number which is both associated with the at least one programmable key and stored in the electronic memory.

3. A telephone as claimed in claim 1, wherein the telephone number is an emergency call number.

4. A telephone as claimed in claim 1, wherein all keys of the telephone for dialing a single digit are covered with the cover.

5. A telephone as claimed in claim 4, further comprising:
   a displaceable part on the cover which covers a programmable key associated with an emergency call number, wherein the programmable key may be actuated after at least one of breaking and bending the displaceable part, the displaceable part simultaneously protecting against inadvertent actuation of the programmable key.

6. A telephone as claimed in claim 4, wherein the cover is detachably mounted on an upper part of a housing of the telephone.

7. A telephone as claimed in claim 6, wherein the cover can be detached from the upper part of the housing via one special tool.

8. A telephone as claimed in claim 4, wherein the cover is integrally formed with an upper part of a housing of the telephone.

9. A telephone as claimed in claim 4, further comprising:
   lettering on the cover which explains functions of programmable keys made accessible by the cover.

10. A telephone is claimed in claim 4, wherein upon mounting the cover to the telephone, the cover activates an electronic contact on the telephone which causes an activation device of the telephone to assign a predetermined emergency call number to one of the keys of the telephone not covered by the cover, and the link-establishing device of the telephone automatically establishes the link to the emergency call number after the respective key has been actuated.

11. A telephone as claimed in claim 4, wherein the cover includes a left-hand guide rail and a right-hand guide jail, the cover surrounding the keypad and left-hand and right-hand lateral surfaces of the telephone, the left-hand guide rail located in a left-hand guide groove on a left-hand underside of the housing and the right-hand guide rail located in a right-hand guide groove on a right-hand underside of the housing.

12. A telephone as claimed in claim 4, wherein the cover includes a left-hand guide rail and a right-hand guide rail, the cover surrounding the keypad and part of left-hand and right-band lateral surfaces of the telephone, the left-hand guide rail located in a left-hand guide groove on the left-hand lateral surface and the right-band guide rail located in a right-hand guide groove on the right-hand lateral surface.

13. A telephone as claimed in claim 11, wherein the left-hand and right-hand guide rails each have a projection which engages a depression in the respective left-hand and right-hand guide groove associated therewith.

14. A telephone as claimed in claim 1, wherein the telephone is a mobile telephone capable of linking telephone calls in at least one mobile radio network.

15. A telephone as claimed in claim 1, wherein the telephone is a wireless telephone for operating in a vicinity of a base station assigned to the wireless telephone.

16. A telephone as claimed in claim 1, wherein the telephone is a wire-bound telephone for operating on a telephone socket.

* * * * *